(12) United States Patent
Lee

(10) Patent No.: US 7,577,777 B2
(45) Date of Patent: Aug. 18, 2009

(54) COMPUTER SYSTEM PROVIDING ENDIAN INFORMATION AND METHOD OF DATA TRANSMISSION THEREOF

(75) Inventor: Jeong-Ju Lee, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/877,815

(22) Filed: Oct. 24, 2007

(65) Prior Publication Data

US 2008/0046615 A1    Feb. 21, 2008

Related U.S. Application Data

(62) Division of application No. 10/607,658, filed on Jun. 27, 2003, now Pat. No. 7,334,066.

(30) Foreign Application Priority Data

Jul. 3, 2002    (KR) .............................. 2002-038307

(51) Int. Cl.
*G06F 13/12* (2006.01)
*G06F 3/00* (2006.01)
*G06F 9/30* (2006.01)

(52) U.S. Cl. ............................. 710/65; 710/30; 710/62; 712/204

(58) Field of Classification Search ....................... None
See application file for complete search history.

(56) References Cited

U.S. PATENT DOCUMENTS

| | | | | |
|---|---|---|---|---|
| 5,867,690 A | * | 2/1999 | Lee et al. | 710/65 |
| 2003/0028746 A1 | * | 2/2003 | Durrant | 711/206 |

* cited by examiner

*Primary Examiner*—Alan Chen
(74) *Attorney, Agent, or Firm*—F. Chau & Associates, LLC.

(57) ABSTRACT

A computer system providing endian information and a method of data transmission thereof are disclosed. The method of data transmission in the computer system of the present invention comprises: reading endian information stored in a base address register of peripheral devices; deciding whether the endian information of the computer system is identical with endian information of the peripheral devices; byte-swapping data of the peripheral devices when the endian information of the computer system is different from the endian information of the peripheral devices, and transmitting the byte-swapped data to a system bus of the computer system; and transmitting the data of the peripheral devices to the system bus when the endian information of the computer system is identical with the endian information of the peripheral devices. Therefore, a data transmission in accordance with the present invention is implemented without any data confusion even when the endian information of the peripheral devices is different form the endian information of the computer system.

5 Claims, 3 Drawing Sheets

COMPUTER SYSTEM PROVIDING ENDIAN INFORMATION AND METHOD OF DATA TRANSMISSION THEREOF

CROSS-REFERENCE TO RELATED PATENT APPLICATIONS

This application is a divisional of U.S. patent application Ser. No. 10/607,658, filed on Jun. 27, 2003, now U.S. Pat. No. 7,334,066 which claims priority to Korean Patent Application No. 2002-38307, filed on Jul. 3, 2002, the disclosures of which are herein incorporated by reference in their entireties.

FIELD OF THE INVENTION

The present invention relates to a computer system and, more specifically, to a computer system providing endian information and a method of data transmission thereof.

BACKGROUND OF THE INVENTION

Generally, computers store bytes of data into memories or manipulate the data so that the data may be transmitted. A "byte" is a unit of storage that can hold a single character and is equal to 8 bits, and a "word" equals 2 bytes, that is, 16 bits. Double words equal 32 bits. A 32-bit computer system stores 32 bits in one address, such as an address "N", and simultaneously loads the 32 bits in a 32-bit data bus. There are two ways to load the 32 bits in the 32-bit data bus: a little endian format and a big endian format.

FIG. 1 is a diagram illustrating a little endian format and a big endian format. As shown in FIG. 1, the little endian format 12 sequentially stores byte #0, byte #1, byte #2, and byte #3 from the least significant bit (LSB) to the most significant bit (MSB). The big endian format 14 sequentially stores byte #0, byte #1, byte #2, and byte #3 from MSB to LSB. Data arranged in the little endian format 12 or the big endian format 14 is loaded into a data bus line as follows: the least significant bits are loaded into a data line A[D7:D0]; more significant bits are loaded into a data line B[D15:D8]; even more significant bits are loaded into a data line C[D23:D16]; and the most significant bits are loaded into a data line D[D31:D24].

A computer system may be connected with various peripheral devices by a peripheral component interconnect (PCI) connector. An audio adaptor card, a graphic adaptor card, a local area network (LAN) interface card, a small computer system interface (SCSI) card, and a PCI-industry standard architecture (PCI-ISA) expansion card are inserted into the PCI connector. The audio adaptor card controls audio output from a speaker, and the graphic adaptor card controls visual output from a display monitor. The LAN interface card connects the computer system with a LAN. The SCSI card can control a CD-ROM driver, a scanner or a high speed SCSI disk drive. The PCI-ISA expansion card can connect a keyboard with an ISA bus, a microphone, and a mouse with a bus. PCI peripheral devices are connected with a controller through a bus, thereby allowing for data communication.

During booting of a computer system, a computer system with a mono endian system chooses to use either the little endian format or the big endian format for data transmission. Thereafter, the computer system performs all tasks using the chosen format for data transmission.

However, a problem exists in that peripheral devices, which are connected to the computer system at the request of a user, may not use the same endian format as the computer system. In addition, known peripheral devices do not identify endian information of a computer system to which they are connected and, therefore, do not allow for altering of the configuration of data from a peripheral device to be compatible with that of the computer system.

For example, if a peripheral device used with a personal computer is set to transmit data in the little endian format and the computer system performs data communication using the big endian format, there will be data confusion between the peripheral device and the computer system. Therefore, the computer system will malfunction.

SUMMARY OF THE INVENTION

It is therefore a feature of the present invention to provide a computer system providing endian information.

It is another feature of the present invention to provide a method of data transmission of the computer system.

A preferred embodiment of the present invention is directed to a computer system comprising a system bus, a system configuration register, a main controller, a PCI host controller and PCI peripheral devices. The system configuration register stores first endian information of the computer system. A main controller is connected to the system bus and controls an operation of the computer system according to a system configuration register value. The PCI peripheral devices store second endian information in a base address register. A PCI host controller is connected between the system bus and the PCI peripheral devices. The PCI host controller compares the first endian information with the second endian information and if the compared data is not identical, the PCI host controller byte-swaps data of the PCI peripheral devices to transmit the data to the system bus. The second endian information is stored in the base address register as one bit. The peripheral devices include: a controller for controlling operations of the peripheral devices; a memory device for storing data of the peripheral devices; a memory controller for controlling the memory device; and a PCI target chip for building the base address register therein, and having address information of the peripheral devices.

According to another embodiment of the present invention, a method of data transmission of a computer system comprises the steps as follows. A PCI host controller reads endian information stored in a base address register of peripheral devices. The PCI host controller compares whether endian information of the computer system is equal to the endian information stored in the base address register of the peripheral devices. If the compared information is not identical, the PCI host controller byte-swaps data of the peripheral devices, and then transmits the data to a system bus of the computer system. If the compared information is identical, the PCI host controller does not byte-swap data of the peripheral device and transmits the data of the peripheral devices to the system bus.

Therefore, according to the present invention, data transmission without data confusion is implemented even when the endian information of the peripheral devices is not identical with the endian information of the computer system.

BRIEF DESCRIPTION OF THE DRAWINGS

The invention may be understood and its objects will become apparent to those skilled in the art by reference to the accompanying drawings as follows.

DETAILED DESCRIPTION OF THE PREFERRED EMBODIMENTS

Preferred embodiments of the present invention will be described below in more detail with reference to the accompanying drawings. This invention may, however, be embodied in different forms and should not be constructed as limited to the embodiments set forth herein. Rather, these embodiments are provided so that this disclosure will be thorough and complete, and will fully convey the scope of the invention to those skilled in the art.

Data transmission of a computer system will be explained hereinafter. In addition, a 32-bit computer system will be described as an example.

Figure 1:
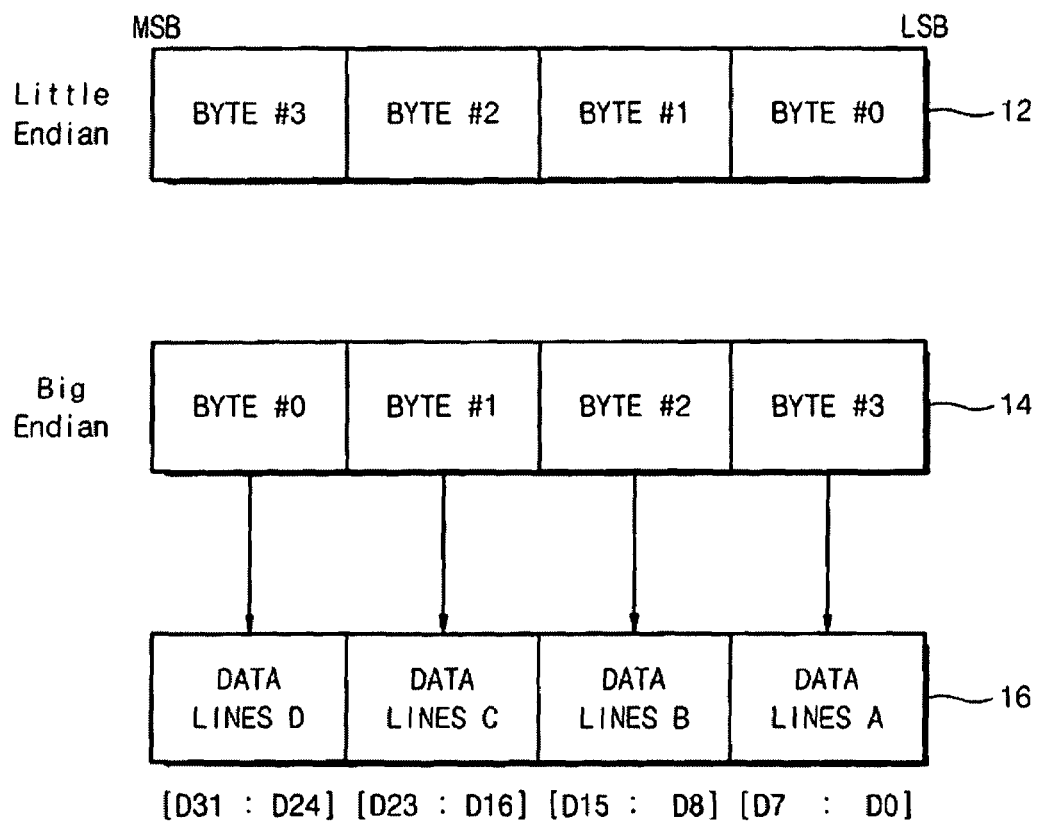
FIG. 1 is a diagram illustrating a little endian byte format and a big endian byte format.
Figure 2:
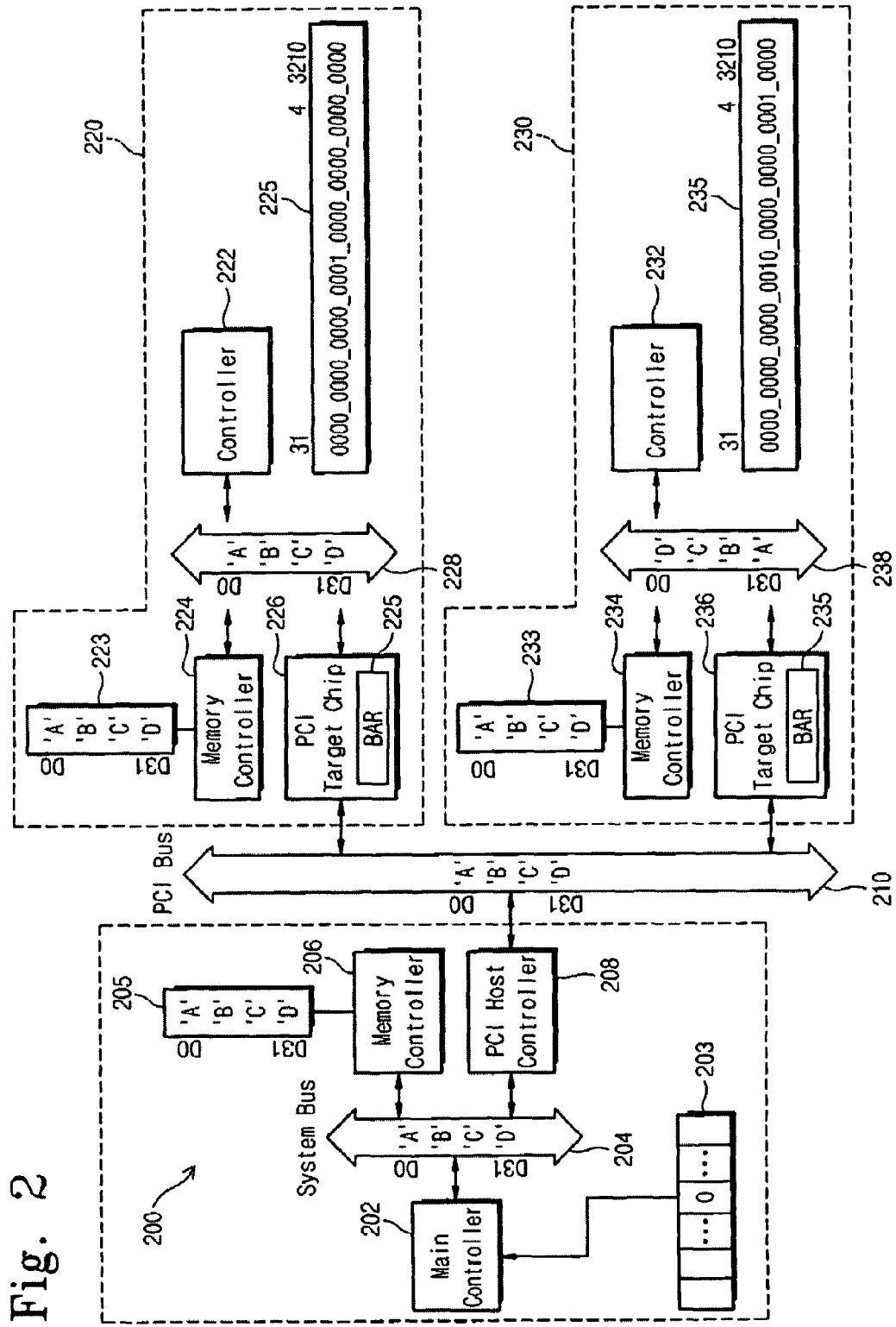
FIG. 2 is a diagram illustrating a computer system in accordance with a preferred embodiment of the present invention.

FIG. 2 is a diagram illustrating a computer system in accordance with a preferred embodiment of the present invention. Referring to FIG. 2, the computer system 200 includes a main controller 202, a system configuration register 203, a system bus 204, a memory device 205, a memory controller 206, a PCI host controller 208, a PCI bus 210, a first PCI card 220 and a second PCI card 230. The main controller 202 is connected to the system bus 204 to control an operation of the computer system 200 according to information from the system configuration register 203. The memory controller 206 is connected between the system bus 204 and the memory device 205. Endian information of the computer system 200 is stored in the system configuration register 203. The PCI host controller 208 is connected between the system bus 204 and the PCI bus 210, connecting PCI cards 220 and 230, which are coupled with the PCI bus 210, with the system bus 204. For example, the size of the system bus 204 and the PCI bus 210 may be 32 bits.

The first PCI card 220 includes a controller 222, a memory controller 224, a memory device 223, a PCI target chip 226 and a bus 228. The controller 222 controls an operation of the first PCI card 220. For example, if the first PCI card 220 is a LAN card, it controls data communication. The memory device 223 stores data of the first PCI card 220 using the memory controller 224. The PCI target chip 226 builds a base address register (BAR) 225 therein, and stores address information and endian information of the first PCI card 220. The size of bus 228 is 32 bits. The second PCI card 230 has almost the same configuration as the first PCI card 220. For example, in case of a sound card, it controls a reciprocal operation with a speaker.

The BAR 225 has 32-bits and uses one of the bits for storing endian information. The endian information of the first PCI card 220 is stored in the fourth bit of the BAR 225 as "0". Endian information of the second PCI card 230 is stored in fourth bit of a BAR 235 as "1".

In this case, for example, the "0" represents a little endian format and the "1" represents a big endian format. The data stored in the memory device 223 of the first and second PCI cards 220 and 230 is [D31:D0]="D" "C" "B" "A". When the endian information of the computer system 200 stored in the system configuration register 203 of the computer system 200 shows "0", i.e., the little endian format, the endian information of the first PCI card 220 becomes "0", so that data presented on the bus 228 of the first PCI card 220 is [D31:D0]="D" "C" "B" "A". Thus, the [D31:D0]="D" "C" "B" "A" is stored as [D31:D0]="D" "C" "B" "A" in the memory device 205 through the PCI bus 210 and the system bus 204.

As a result, data transmission is carried out without any data confusion between the first PCI card 220 and the computer system 200.

On the other hand, when the endian information of the second PCI card 230 is "1", the PCI host controller 208 recognizes that endian information of a memory system is different from the endian information of the second PCI card 230. Data [D31:D0]="D" "C" "B" "A" stored in a memory device 233 of the second PCI card 230 is shown as [D31:D0] ="A" "B" "C" "D" on a bus 238. The PCI host controller 208 byte-swaps the data [D31:D0] "A" "B" "C" "D" of the bus 238 and transmits the byte-swapped data to the system bus 204 in the state of the data [D31:D0]="D" "C" "B" "A". After that, the data [D31:D0]="D" "C" "B" "A" of the system bus 204 is stored as [D31:D0]="D" "C" "B" "A" in the memory device 205. Therefore, the PCI host controller 208 prevents existing data confusion by byte-swapping data of the second PCI card 230 when the endian information of the computer system 200 is different from the endian information of the second PCI card 230.

Figure 3:
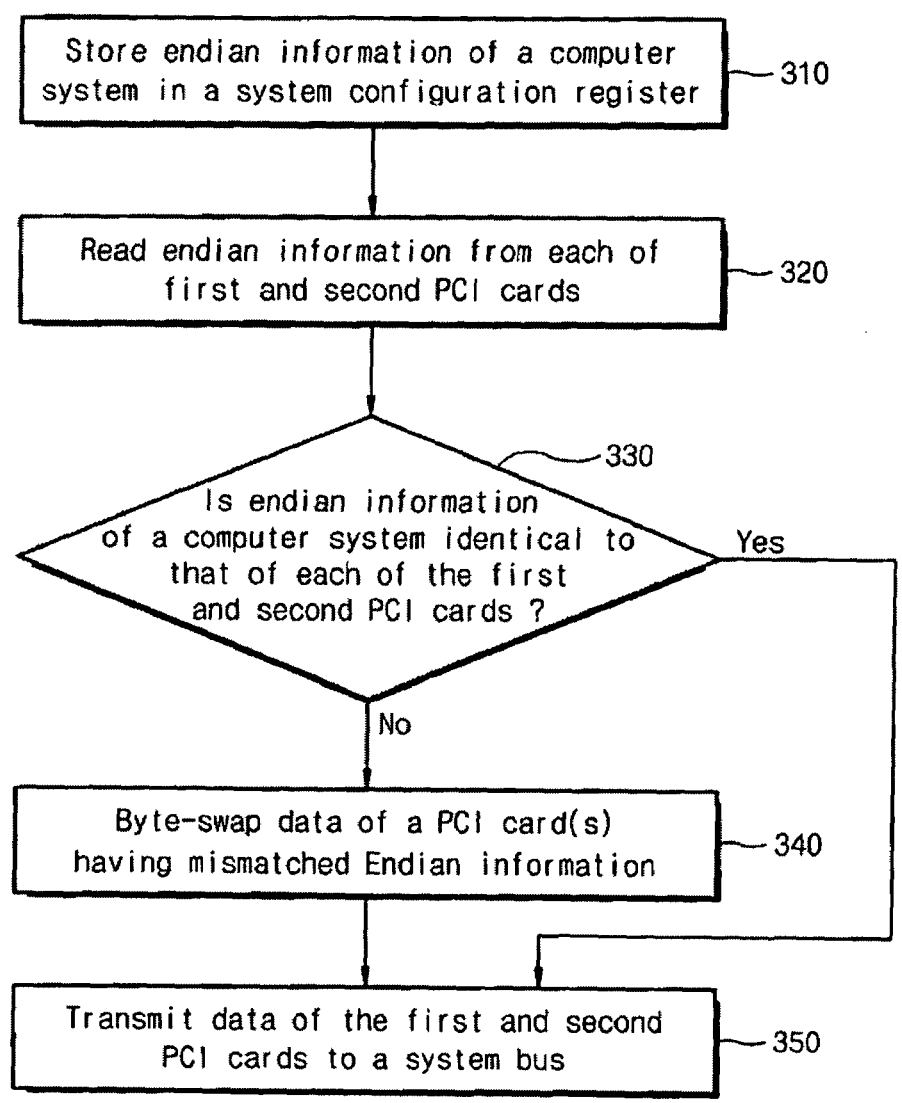
FIG. 3 is a diagram illustrating a method of data transmission in accordance with a preferred embodiment of the present invention.

The method of data transmission in accordance with the computer system 200 is described in FIG. 3. Referring to FIG. 3, endian information, for example, little endian information of a computer system 200 is stored in a system configuration register 203 (block 310). Then, a PCI host controller 208 reads little endian or big endian information stored in base address registers 225 and 235 of first and second PCI cards 220 and 230, respectively (block 320). The PCI host controller 208 decides whether the endian information of the computer system is the same as the endian information of the first PCI card 220 and the second PCI card 230 (block 330). When the endian information of the computer system is identical to the endian information of the first PCI card 220, the PCI host controller 208 transmits data of the first PCI card 220 to a system bus 204 (350). If the endian information of the computer system is different from the endian information of the second PCI card 230, the PCI host controller 208 byte-swaps data of the second PCI card 230 (block 340). The byte-swapped data of the second PCI card 230 is transmitted to the system bus 204 (block 350).

As described above, the computer system of the present invention stores endian information identifying the endian format being used in one bit of a base address register built in to peripheral devices connected to the computer system. Then, a PCI host controller decides whether endian information of the computer system is the identical with endian information of the peripheral devices. If the compared information is not identical, the controller byte-swaps data of the peripheral devices to transmit the data. Thus, a data transmission is carried out without data confusion even when the endian information of the peripheral devices is different from the endian information of the computer system.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A computer system, comprising:
a system bus;
a system configuration register for storing first endian information of the computer system;

at least one peripheral device having a base address register for storing second endian information; and a host controller connected between the system bus and the at least one peripheral device, for comparing the first endian information with the second endian information, for byte-swapping data read from the at least one peripheral device if the first endian information and the second endian information are different, and for transmitting the byte-swapped data to the system bus, after byte-swapping the data read from the at least one peripheral device.

2. The computer system of claim 1, wherein the second endian information is stored in the base address register as one bit.

3. The computer system of claim 1, wherein the at least one peripheral device comprises:

a controller for controlling operation of the at least one peripheral device;

a memory device for storing data read from the at least one peripheral device;

a memory controller for controlling the memory device; and a target chip having address information read from the at least one peripheral device.

4. The computer system of claim 3, wherein the target chip is used for building the base address register.

5. The computer system of claim 1, further comprising a main controller connected to the system bus and for controlling an operation of the computer system according to a value of the system configuration register.

* * * * *